Jan. 7, 1930.  F. J. HILBURGER  1,742,540
VEHICLE SEAT
Filed Aug. 18, 1927
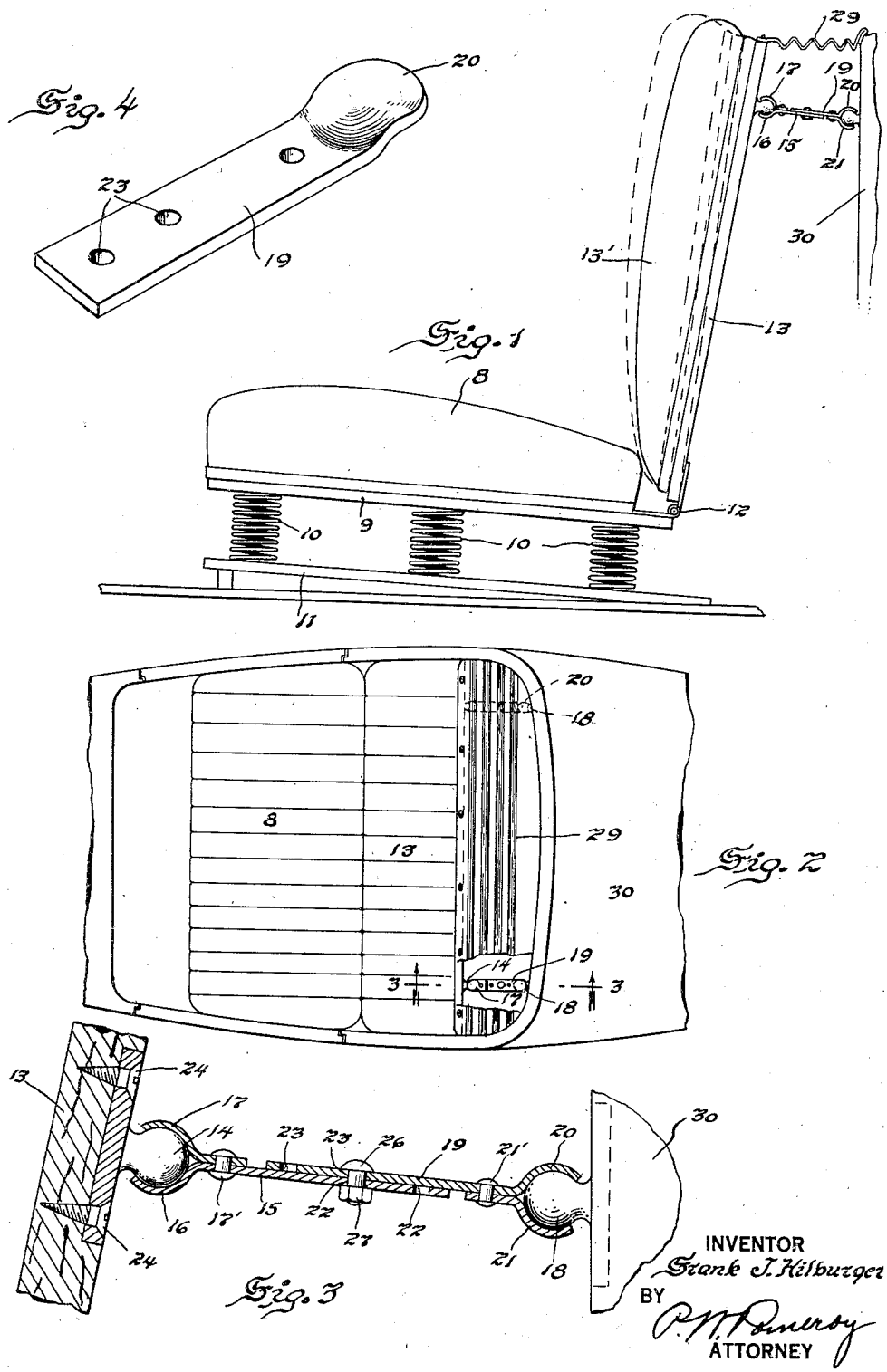
INVENTOR
Frank J. Hilburger
BY
ATTORNEY Patented Jan. 7, 1930

1,742,540

UNITED STATES PATENT OFFICE

FRANK J. HILBURGER, OF SOUTH BEND, INDIANA, ASSIGNOR TO THE STUDEBAKER CORPORATION, OF SOUTH BEND, INDIANA, A CORPORATION OF NEW JERSEY

VEHICLE SEAT

Application filed August 18, 1927. Serial No. 213,879.

This invention relates to vehicle seats and more particularly to means for adjusting the same. One object of this invention is to provide a seat and back adapted to move together with means for adjusting the inclined position of the back portion.

Another object is to provide a seat portion, a back hinged thereon, and means connected with the back for providing adjustment of the same in a plane longitudinally of the axis of the vehicle.

A further object is to provide a resiliently mounted seat, a back hingedly mounted thereon and means pivotally secured to the seat back and the body frame, for adjusting the position of the seat back and permitting movement of the back and seat.

These being among the objects of the present invention, the same consists of certain features of structure and combination of parts to be hereinafter described with reference to the accompanying drawing and then claimed, having the above and other objects in view.

In the accompanying drawing, which shows a suitable embodiment of the present invention, Figure 1 is a diagrammatic side view of a vehicle seat assembly.

Figure 2 is a fragmentary top view of a vehicle body showing the adjusting means for the seat back.

Figure 3 is a fragmentary sectional view of the seat back adjusting means taken on the line 3—3 of Figure 2.

Figure 4 is a perspective view of one of the adjusting members.

This invention is used preferably in automobile seat constructions, but it will appear from the following description that the structure is easily adapted for use in connection with any seat in which it is desirable to adjust the position of the back relative to the seat.

As shown in the drawing, in which like characters of reference refer to like parts, the seat cushion 8 mounted on the seat frame 9 is resiliently supported by the coil springs 10 which are secured between the seat frame 9 and the conventional floor structure 11. Hingedly mounted at 12 upon the seat frame at the rear edge thereof is a back frame 13 and a cushion 13'. In close proximity to the upper edge of the seat back 13 are pivotally mounted adjusting devices which will be described in detail in the description to follow. As seen from the foregoing description, no portion of the seat or back is rigidly secured to a mounting and the seat and back therefore, are free to float so that jars and road shocks will not be transmitted to the same.

As the adjusting devices for the seat back above mentioned are identical in structure, only one of the same will be described in detail.

As seen in Figures 1 and 3, a ball member 14 is secured to the back frame 13 by screws 24. Pivotally supported by the member 14 is a strap member 15 having one end portion 16 thereof cup-shaped to conform in shape with the ball member 14. A clamping member 17 is provided which has an end similar in shape to the end portion 16 of the strap member 15, the clamping member 17 and the strap member 15 being secured together by the rivets 17' to form with the ball member 14 a ball and socket joint.

A ball member 18 similar to the member 14 is mounted on the frame of the vehicle body 30 in oppositely disposed relation to the member 14. A strap member 19, provided with a cupped end portion 20, is pivotally secured to the ball member 18 by a clamping member 21 which is riveted to the member 19 as at 21'. Each of the members 18, 19 and 21 may be identical in shape, respectively, with the members 14, 15 and 17.

To facilitate adjustment of the seat back 13, the member 15 is provided with spaced openings 22 and similarly the member 19 is formed with openings 23 and although only two openings have been shown in each member, it is understood that any number may be provided. Adjustment is, of course, effected by varying the alignment of the several openings in the members 15 and 19, and they are maintained in the desired position by means of a bolt 26 and a nut 27. To give a finished appearance to the vehicle, a cover 29 for the opening between the seat back and vehicle body 30 is provided, the opening being readily accessible for storing the vehicle curtains and the like.

It will be seen from the foregoing description that the structure has qualities of easy riding because any shocks or jars will be absorbed by the coil springs beneath the seat portion. Any movement of the seat will be transmitted to the back, the same being hinged to the seat and universally pivoted to the body. Such structure will allow unitary movement of the seat and back and permit the occupant to maintain at all times an easy and comfortable position.

Formal changes may be made in the specific embodiment of the invention described without departing from the spirit and substance of the broad invention, the scope of which is commensurate with the appended claims.

What I claim is:

1. In combination with a vehicle body, a seat resiliently mounted thereon, a back hinged to said seat, and means for holding said seat back in predetermined inclined position comprising oppositely disposed ball end members secured to said seat back and frame of said body, perforated strap members connecting said ball members for allowing movement of said seat and back relative to said body, and means for pivotally securing said strap members to said ball members.

2. In a vehicle body, a seat therefor having a pivoted back portion, and expandable supports for said back portion comprising a plurality of oppositely disposed ball end members secured to said back and frame of said body, perforated strap members connecting said ball members, and clamping members for pivotally securing said strap members to said ball members.

3. In a vehicle body, a seat frame having a hinged seat back movable to a plurality of inclined positions, and an expandable support for said seat back for maintaining said back in any of the inclined positions comprising a pair of perforated strap members having ball and socket connections with said seat back and a portion of said body, and a pin for uniting said strap members, said pin extending through certain aligned perforations in said strap members for one inclined position of said seat back and extending through certain other aligned perforations for a different inclined position of said seat back.

4. In a vehicle body, a seat therefor having a pivoted back portion, a member having a ball end secured to said back, a perforated strap member supported by said ball, means for pivotally securing said strap member to said ball, a corresponding member having a ball end secured to the frame of said body in oppositely disposed relation to the first-mentioned ball member, a strap member having perforations formed therein, means for pivotally supporting said strap member on the second of said ball members, and means for securing said strap members in adjusted alignment whereby the seat back may be inclined to a predetermined position relative to said seat.

5. In a vehicle body, a resiliently mounted seat therefor, a back portion pivoted to said seat, a member having a ball end secured to said back, a perforated strap member having a socket means for pivotally securing said strap member to said ball, a corresponding member having a ball end, a second strap member having perforations formed therein and having socket means for pivotally securing said strap member to the second of said ball members, and means for securing said strap members in adjusted alignment comprising a pin received by certain aligned perforations in said strap members whereby said seat back may be inclined to a predetermined position relative to said seat, said pivotally mounted strap members and resilient mounting of said seat permitting unitary movement of said seat and back relative to said body.

Signed by me at South Bend, Indiana, this 15 day of August 1927.

FRANK J. HILBURGER.